Patented Jan. 8, 1924.

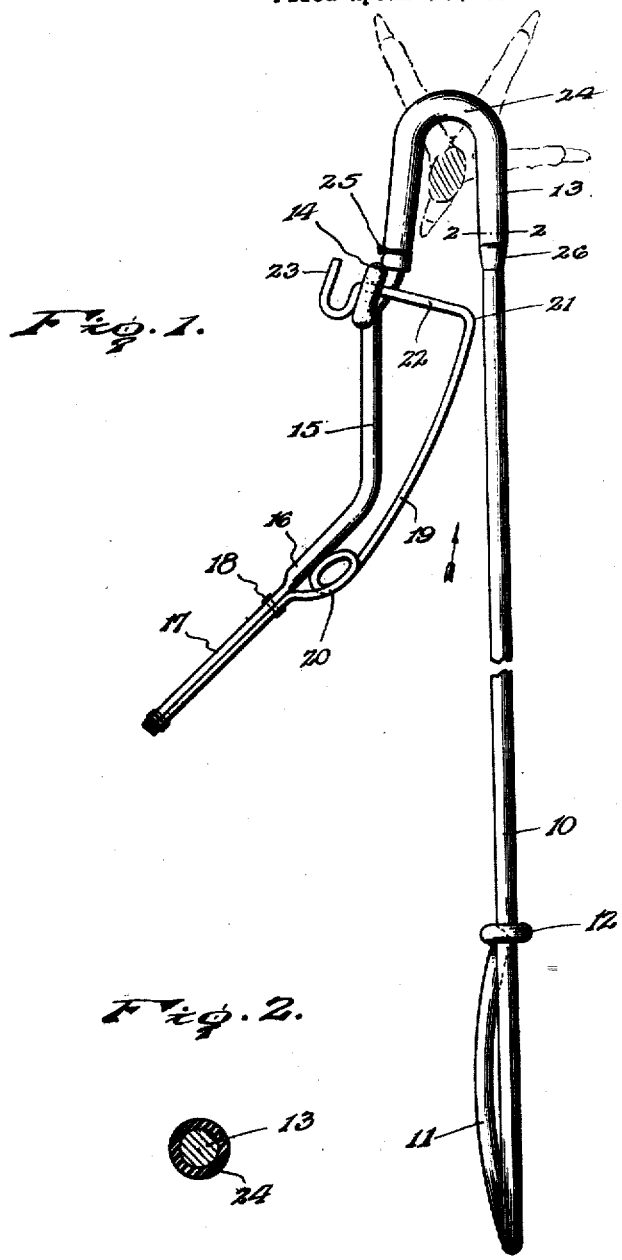

1,480,173

UNITED STATES PATENT OFFICE.

JASPER NEWTON MANSFIELD, OF CUB RUN, KENTUCKY.

ANIMAL CATCHER.

Application filed April 11, 1923. Serial No. 631,396.

*To all whom it may concern:*

Be it known that I, JASPER NEWTON MANSFIELD, a citizen of the United States, residing at Cub Run, in the county of Hart and State of Kentucky, have invented certain new and useful Improvements in Animal Catchers, of which the following is a specification.

My invention relates to an implement used to catch animals and more particularly poultry.

The main object of this invention is to provide an implement with which it is easy to catch any selected hen, goose, duck or turkey, by placing the crook of the implement around the fowl's leg and without injury to the same. A further object is to make the catch sure, as other crooks of this character often permit the fowl to get loose after it has been caught, in case the hold is slackened or the fowl turns around and runs in another direction.

In the accompanying drawing one embodiment of the invention is illustrated, and;

Figure 1 shows a top plan view of the device; and

Figure 2 is a transverse section along line 2—2 of Figure 1.

The implement consists of a long staff 10, preferably made of a metal rod or wire, and on which a handle 11 is formed by bending the wire on itself to produce a loop, and turning the end of the wire around the main part of the staff 10, as seen at 12.

The staff 10 is straight and terminates with a crook 13 at the end opposite of the handle. This crook is elongated and has a small eye formed thereon on the inner end of the crook as at 14, from where the crook continues with a straight shank 15, and an outwardly bent portion 16, which is preferably flattened as at 17.

To this flat portion 17 of the implement is rigidly attached as by rivets 18 or by welding, a spring 19. In order to give more resiliency to the spring, a coil 20 is formed thereon near the part 17 where it is secured. The spring continues in the direction of the crook 13 and it is bent at right angles to form an elbow 21, which almost touches the straight part of the staff 10. The straight shank 22, after having passed through the eye 14, terminates with a hook or grip 23. It will now be evident that the straight shank 22 closes the open end of the crook 13.

In order to prevent injury to the fowl when caught, the crook 13 is preferably covered with a lining 24 of felt or rubber, or any other suitable soft material. A short piece of rubber tubing is very suitable for this lining, which may be secured by means of a piece of wire 25 twisted around it. The other end of the lining may be tapered, as at 26, so as not to form an obstruction for the leg of the fowl when passing into the crook.

When using the implement, the operator may scatter corn on the ground in an open space, so that the fowls will gather around at this place, and it will then be an easy matter to slip the crook around the selected fowl's foot, when the leg will pass by the elbow 21. It will then snap back quickly and hold the fowl's leg in the closed crook.

If the fowl should happen to hide behind a bush, this implement will also be found very useful, as it will then be possible to reach around the bush and get hold of the fowl.

It should be noted that the inner shank of the crook 13 lies in straight alinement with the staff 10 in order to facilitate the catching of the animal, there being no offset or obstruction at this point forming the entry of the crook. After the animal has been caught and is held in the crook, its leg is easily released by pulling out the grip 23, when the shank 22 and knuckle 21 are swung away from the opening of the crook, thus permitting the withdrawal of the animal's leg.

A practical length for the staff has been found to be from four and one half to five feet, and the distance between the elbow 21 and the staff 10 ought to be from one fourth to five-sixteenths of an inch. With this length of the staff a hen may be easily reached and caught when on a limb of a tree, or on a roost pole.

Having thus described the invention what is claimed as new is:

An animal catcher comprising a staff terminating with a crook at one end and with a looped handle at the other end, a resilient element rigidly secured at one end to the free shank of the crook, said element being coiled and having a transversely directed portion substantially closing the entry to said crook and terminating with a finger grip, a coiled loop being formed on said shank providing a guide for said transverse portion and normally abutting against said grip limiting the closing movement of said resilient element.

In testimony whereof I affix my signature.

JASPER NEWTON MANSFIELD. [L. S.]